United States Patent
Kulhavy

(12) 
(10) Patent No.: US 6,267,337 B1
(45) Date of Patent: Jul. 31, 2001

(54) VERTICALLY ADJUSTABLE SUPPORT FOR A CHAIR OR TABLE

(75) Inventor: Sava V. Kulhavy, St. Gallen (CH)

(73) Assignee: Cabex AG, Vaduz (CH)

( * ) Notice: Subject to any disclaimer, the term of this patent is extended or adjusted under 35 U.S.C. 154(b) by 0 days.

(21) Appl. No.: 09/313,069

(22) Filed: May 17, 1999

(30) Foreign Application Priority Data

May 15, 1998 (EP) .................................................. 98810449

(51) Int. Cl.⁷ .................................................. F16M 11/00
(52) U.S. Cl. ..................................... 248/161; 297/344.18
(58) Field of Search .................................. 248/161, 157, 248/631, 622, 404, 188.2, 407, 562, 406.1; 403/109.1, 109.2, 109.3, 377; 297/344.19, 344.12, 344.18

(56) References Cited

U.S. PATENT DOCUMENTS

| 3,913,187 | * | 10/1975 | Okuda ................................. 248/74.3 |
| 5,413,414 | * | 5/1995 | Bauer ................................... 384/276 |
| 5,496,115 | * | 3/1996 | Bauer ................................... 384/291 |
| 5,836,699 | * | 11/1998 | Back ..................................... 384/276 |
| 5,865,542 | * | 2/1999 | Ryu ........................................ 384/29 |
| 5,888,014 | * | 3/1999 | Lung et al. ........................ 403/109.1 |

FOREIGN PATENT DOCUMENTS 9200884 4/1992 (DE) .
0551604 7/1993 (EP) .

* cited by examiner

Primary Examiner—Ramon O. Ramirez
Assistant Examiner—Gwendolyn Baxter
(74) Attorney, Agent, or Firm—Browdy and Neimark

(57) ABSTRACT

The support comprises a sleeve (20) for guiding an arrangement (10) for the adjusting of the length of the support, whereby this guiding sleeve (20) is inserted in a guiding tube (1). The guiding sleeve (20) has a tubular piece (21), the longitudinal axis of which lies on the main axis A of the support. From the outer surface (23) of the tubular piece (21), outer ribs (22) protrude, which extend up to the interior surface (24) of the guiding tube (1). From the inside (43) of the tubular piece (21), interior ribs (42) protrude, which extend from the interior side (43) of the tubular piece (21), interior ribs (42) protrude, which extend from the interior side (43) of this tubular piece (21), against the main axis A of the support. The front area (40) of the interior rib (42) has a curved front face (39), the radius of the curvature corresponds to the curvature radius of the outer wall (14) of the adjusting equipment (10). Said front area (40) further comprises at least one lip (50,57,60), which is adapted in such a manner, that the adjusting equipment (10) can also be supported by said lip.

20 Claims, 4 Drawing Sheets

VERTICALLY ADJUSTABLE SUPPORT FOR A CHAIR OR TABLE

The present invention relates to a support, especially for chairs, tables and the like, with an arrangement for adjusting the length of the support, and with a sleeve for the guiding of the adjusting arrangement, whereby this sleeve is inserted in a guiding tube.

It is known, that the outside of those adjusting equipments, which are used in the supports of said type, is generally tubular shaped. It is also known that extraordinary large lateral forces, caused for example by a strong one-sided loading of the seat of a chair, can act on the adjusting equipment. The users of the chair or of a table, having such a support or the like, request, that the adjusting equipment sits free of wabbling in the guiding tube also when extremely large lateral forces are present and that the length of said equipment nevertheless can be adjusted. This demand can be satisfied in that manner, that the adjusting equipment is fitted in the guiding tube with a high precision. But the related manufacturing costs are correspondingly high.

The object of the present invention is to eliminate not only said disadvantages but also further disadvantages of the prior art.

This object is achieved at the support of the generic type defined in the beginning of this specification in accordance with the present invention in a manner which is defined in the characteristic part of the patent claim 1.

Figure 1:
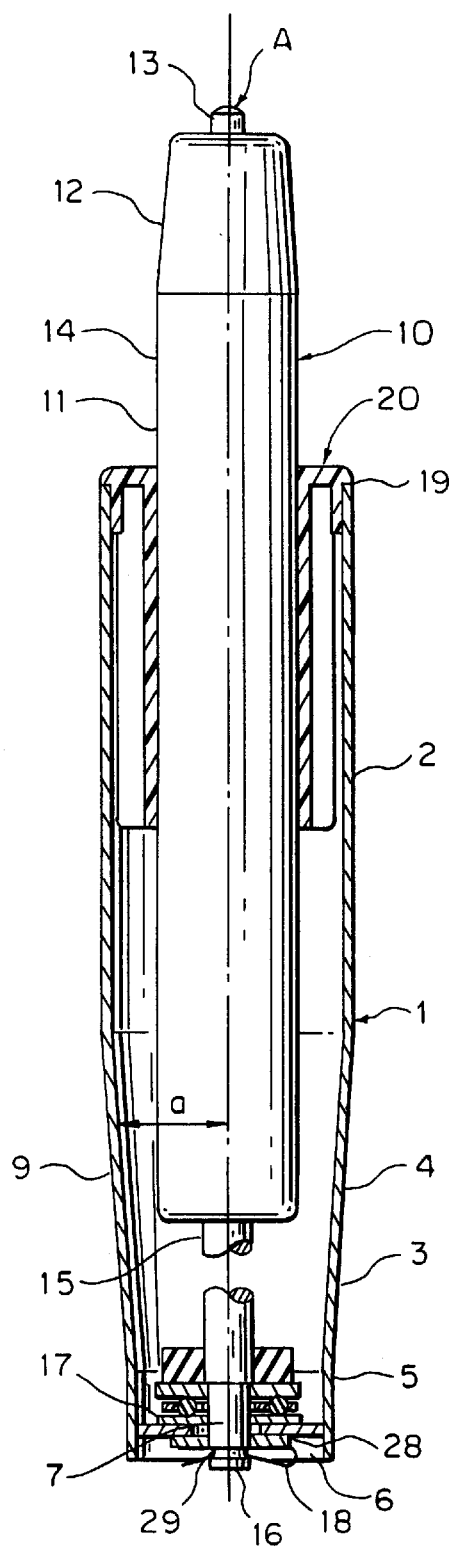
Figure 2:
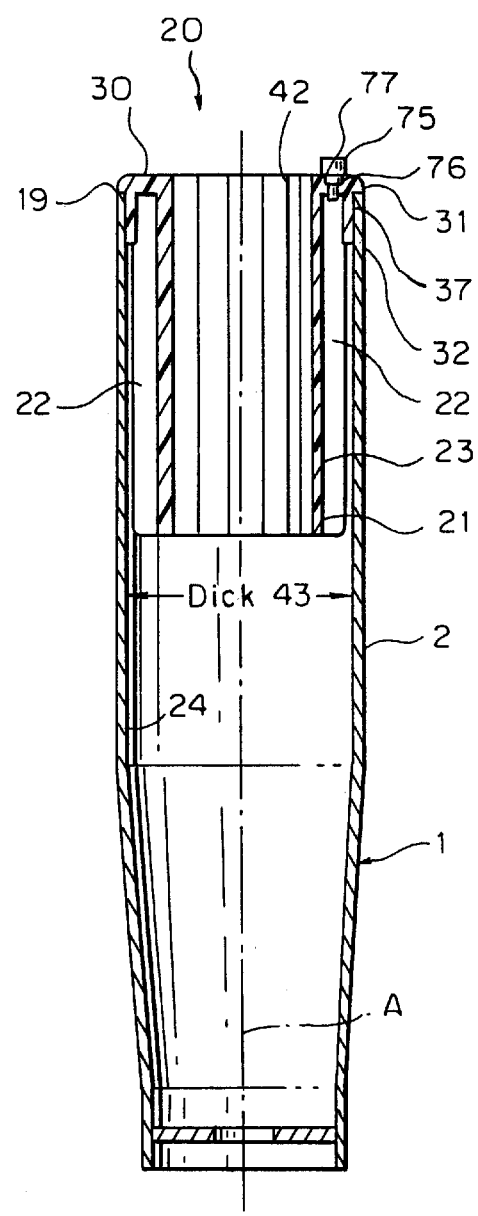

The following embodiments of the present invention are described in connection with the enclosed drawings in more detail. It shows:

FIG. 1 the present support in a vertical extending longitudinal cut,

FIG. 2 in a vertical extending longitudinal cut a guiding tube of the support in FIG. 1, into which a guiding sleeve is inserted.

Figure 3:
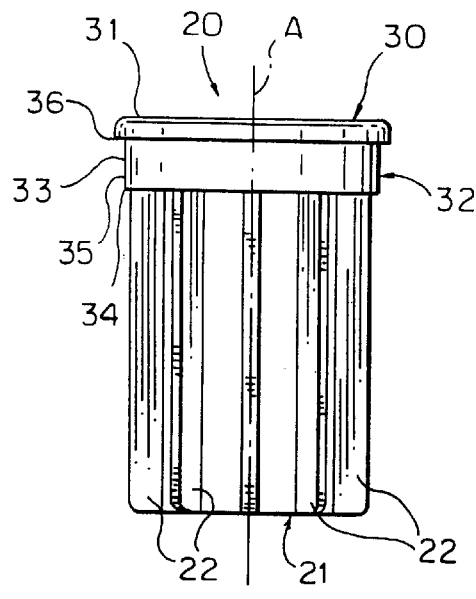
Figure 5:
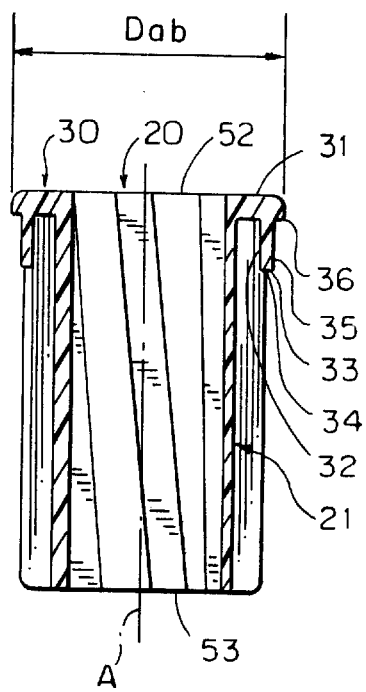
Figure 4:
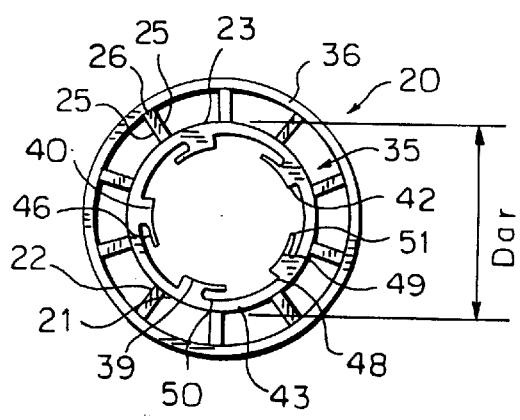
Figure 6:
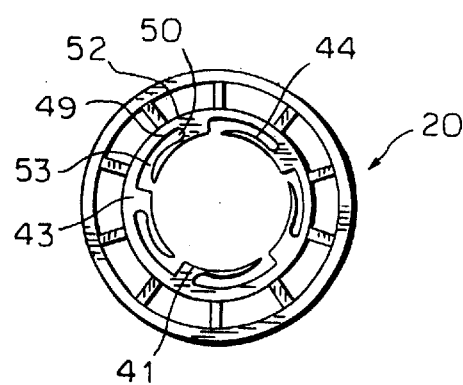
Figure 7:
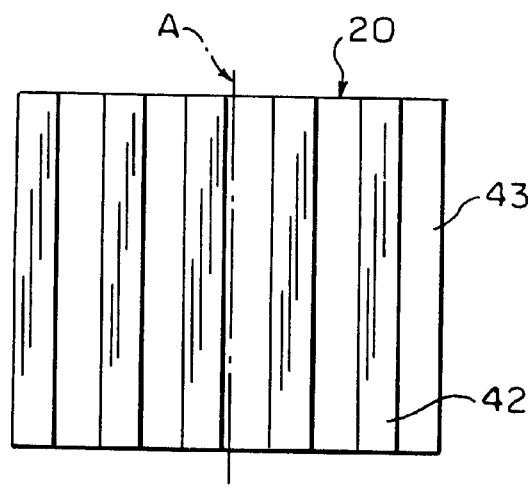
Figure 8:
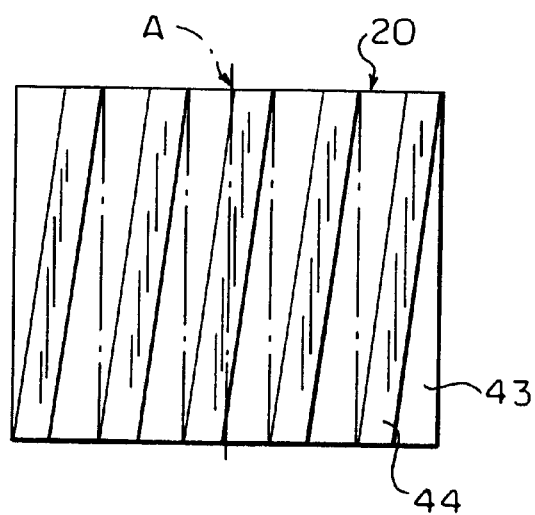

FIG. 3 in a side-view a guiding sleeve, which is one of the components of the guiding tube according to FIG. 2, FIG. 4 a horizontal extending cut through the guiding sleeve according to FIG. 3, FIG. 5 in a vertical extending cut a second embodiment of the guiding sleeve, FIG. 6 in a horizontal extending cut the sleeve from FIG. 5, FIG. 7 in a flat plane, the inside of that one embodiment of the guiding sleeve, which is depicted in FIG. 2, FIG. 8 in a flat plane, the inside of that embodiment of the guiding sleeve, which is depicted in FIG. 5, 6 resp.

Figure 9:
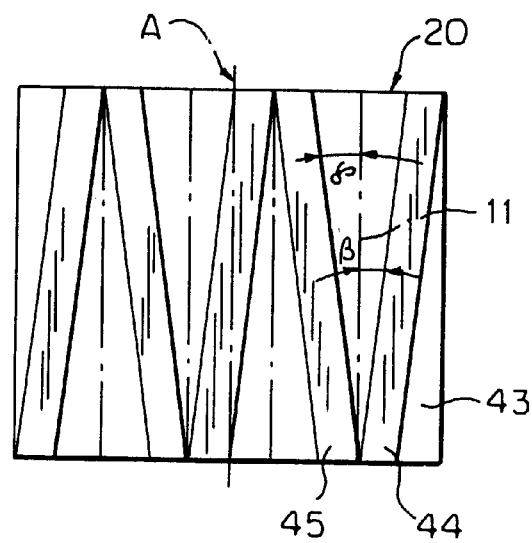

FIG. 9 in a flat plane, the inside of a third embodiment of the guiding sleeve and FIGS. 10 to 13 four further embodiments of the profile of the supporting ribs in the inside of the guiding sleeve.

FIG. 1 shows the present support in a vertical extending longitudinal cut. This support can be used, for example, for adjusting the height of a seat, of a table plate etc. The lower part of such a support can be inserted into the hub of a pedestal (not shown). The upper end portion of the support bears for example the seat of a chair, the plate of a table or the like.

The present support comprises among other things also a guiding tube 1, the longitudinal axis of which coincides with the longitudinal or main axis A of the support. The main section 2 of the guiding tube 1, which is placed in the upper area of the guiding tube 1, is practically tubular shaped. In its lower area, the guiding tube 1 has a tapered section 3, which is connected to the main section 2 and which is in one piece with this main section 2.

The lower tube section 3 consists of a cone shaped part 4 and of a tubular shaped Part 5. An angle alpha, which extends between the side line S of the cone shaped tube part 4 and the main axis A, amounts between 2 and 15 degrees, so that the cone part 4 has a steeply running surface, a steeply running side wall respectively. This cone part 4 can be inserted into the pedestal mentioned in the foregoing. The wider end of the cone shaped tube part 4 is connected to the main section 2 of the guiding tube 1. The tubular shaped tube part 5 of the lower tube section 3 is connected to that one end of the cone shaped tube part 4, which has the smaller diameter. The diameter of this lower tube shaped part 5 is smaller than the diameter of the main section 2 of the guiding tube 1. In the interior of the cylinder shaped tube part 5, a bottom plate 6 is secured, which stands practically at a right angle to the main axis A of the support. In the middle of this bottom plate or disk 6, an opening 7 is carried out.

Further, the present support comprises an arrangement 10 for adjusting the length of the support, whereby this arrangement 10 is carried out as a fluid spring. This can be a gas spring for example or a hydraulic spring. Such springs are generally known. The length of the adjusting equipment 10 can be adjusted and locked in a known manner. Said adjusting arrangement 10 has a tubular shaped housing 11, in which a piston (not shown) is placed. This casing, respectively this cylinder 11 is inserted from above into the main section 2 of the guiding tube 1, so, that the longitudinal axis of this arrangement 10 lies on the longitudinal axis A of the support. The upper part of the spring casing 11 projects from the upper end of the guiding tube 1. A cone 12 is connected to said upper end. The seat of a chair, the plate of a table or the like can be put on said cone 12. For the operation of said arrangement 10, a plunger 13, which is per se known, projects axially from the upper front face of the cone shaped end portion 12 of the adjusting equipment 10.

From the lower front face of the spring casing 11, a piston rod 15 of the adjusting arrangement 10 projects. That one end of the piston rod 15, which lies inside of the cylinder 11, is connected to the piston, which was mentioned in the foregoing.

That one end portion of the piston rod 15, which projects from the housing 11, is assigned to the bottom plate 6 of the guiding tube 1. This portion of the piston rod 15 is provided with an axially protecting pivot 16. The diameter of this pivot 16 is smaller than the diameter of the post on rod 15. The pivot 16 goes through an axial ball bearing 17, which rests on the bottom disk 6. The axis of the central opening in the axial bearing 17 lies on the main axis A of the support as well.

the pivot 16 is executed so long that its free end portion protrudes below from the opening 7 in the bottom disk 6. In this free end portion of the pivot 16, a circular groove 29 is carried out. The mentioned end portion is provided with a locking element 18. This locking element 18 is essentially an U-shaped spring. In one of the legs, in the upper leg 28 of this spring 28 respectively, essentially an U-shaped slot (not shown) is carried out. The distance between the inside edges of said slot corresponds to the diameter of the bottom of the groove 29 in the pivot 16. The locking element 18 can be carried out however also as a cotter pin, which is put through an opening in the free end portion of the pivot 16. The guiding tube 1 and the casing 11 of the adjusting arrangement 10 are preferably of steel.

Starting from the free or upper orifice 19 of the main section 2 of the guiding tube 1, a guiding sleeve 20 is inserted in the guiding tube 1, which serves for the mounting of the adjusting arrangement 10 (FIGS. 1 to 5). Preferably, this guiding sleeve 20 is made of a material which is softer than the casing 11 of the adjusting equipment 10, whereby this softer material can preferably be plastic. The guiding sleeve 20 has a tubular or cylindrically shaped main body 21 (FIGS. 2 and 3), the longitudinal axis of which lies on the main axis A of the support. The length of the tubular piece 21 is smaller than the length of the main section 2 of the guiding tube 1. The outer diameter Dar (FIG. 4) of the tubular piece 21 is smaller than the inner diameter Dih (FIG. 2) of the main section 2 of this guiding tube 1.

Outer ribs 22 project form the outer surface 23 of the tubular piece 21, which extend on the one hand in the axial direction and on the other hand in the radial direction of the support. These outer ribs 22 are distributed in the peripheral direction along the outer surface 23 of the tubular piece 32 and in distances of each other. In the shown case, the guiding sleeve 20 has ten outer ribs 22 which are placed in distances from each other, whereby the magnitude of these distances is the same. The length of the ribs 22 in the axial direction is comparable with the length of the tubular piece 21, so that the ribs 22 extend practically along the entire length of the tubular piece 21. That one length of the ribs 22, which extends in the radial direction, is closed in such a way, that it bridges the distance between the outer surface 23 of the tubular piece 21 and the inside surface 24 of the main section 2 of the guiding tube 1, and that the guiding sleeve 20 sits in the guiding tube 1 free of clearance. This purpose is reached by inserting of the guiding sleeve 20 into the guiding tube 1 sleeve 20 with force fit.

The form and the measurements of the cross-section of the respective outer rib 22 are chosen in dependency on the material of the guiding sleeve 20, so, that the axis of the guiding sleeve 20 doesn't leave the main-axis A of the support even if the maximum of the lateral pressure acts upon the upper end 12 of the spring 10. The cross-section of the ribs 22 is in the represented case rectangular shaped in the shown case, the longer sides 25 of the cross-section of the rib 22 extends between the outer surface 23 of the tubular piece 21 and the interior surface 24 of the guiding tube 1. For big loads, the ribs 22 can be so oriented, that the shorter sides 26 of the cross-section of the rib 22, having the rectangular shaped cross-section, extend between the tubular piece 21 and the guiding tube 1.

Further, the guiding sleeve 20 has a ring shaped collar 20 which is assigned to the upper end of the tubular piece 21 and which is in one piece with the tubular piece 21. The cross-section of the annular collar 20 is essentially L-shaped so that said cross-section has a first resp. horizontal leg 31 and a second resp. vertical leg 32 (FIG. 5). These L-legs 31 and 32 stand practically rectangularly to each other. The free end portion of the horizontal L-leg 31 is connected to the upper edge of the tubular piece 21 and it is in one piece with the tubular piece 21. The upper end portion of the vertical leg 32 of the ring-collar 30 is adjoined at the opposite end of the horizontal leg 31 and it is with the horizontal leg 31 in one piece. The outer diameter Dab of the vertical collar leg 32 is somewhat bigger than the inner diameter Dih of the main section w of the guiding tube 1.

Beginning from the outside of the vertical leg 32, and essentially circular recess 33 with a rectangular shaped cross-section is carried out in the vertical leg 32. This recess 33 adjoins at one end the lower front face 34 of the free end portion of the vertical collar leg 32. Consequently, the recess 33 has a tubular shaped wall 35 running practically parallel to the main axis A. Said wall 35 forms one of the longer sides of the rectangular shaped recess 33 and it represents the bottom of this recess 33. Furthermore, this recess 33 has a lateral surface 36 projecting from said bottom 35, which corresponds to the shorter side of the rectangular shaped cross-section. This horizontally extending lateral surface 36 has the form of a flat ring and it is a stop, which rests on the front edge 19 of the main section 2 of the guiding tube 1, when the guiding sleeve 20 is put into that guiding tube 1. In this case, the tubular shaped bottom 35 of the recess 33 rests on the inside 24 of the guiding tube 1.

Between the outside 23 of the tubular piece 21 and the inside of the vertical leg 32 (FIG. 3), there is a space, the upper section of which is bridged by that one part of the horizontally running L-leg 31 of the ring shaped collar 30, which lies over said space. In this bridge section of the horizontal leg 31, a bore 37 is carried out, the longitudinal axis of which runs parallel to the main axis A of the support. In said bore 37 a stop buffer 75 is inserted. It has a head 76. A bolt 77 adjoins the under-side of the head 76. The bolt 77 lies in the bore 37. The buffer 75 is made up of an elastic material and its head 76 should avoid a hard s top, when the underside, for example the seat of a chair, moves into its lower end position. In angle distances of 120 degrees, three such bores 37 are carried out in the horizontal leg 31 of the ring collar 30, so that three stop buffers 75 can be placed along the ring collar 30.

From the inside of the tubular piece 21, inside ribs 42 project, which extend on the one hand from the inside 43 of the tubular piece 21 in the radial direction against the main axis A of the support, and on the other hand along the inside 43 of the tubular piece 21 in the axial direction. The interior ribs 42, which are shown in FIG. 2 and 4, run parallel to the main axis A of the support resp. parallel to the surface lines of the tubular piece 21. FIG. 7 shows the inside 43 of the guiding sleeve 20 according to FIGS. 2 and 4, when this interior side 43 is developed into a flat plane. The inside ribs 42 run parallel not only with respect to the main axis A of the support but also to each other. In the shown case, the guiding sleeve 20 has five inside ribs 42.

That one length of the ribs 42, which matches the axial direction of the sleeve 20 is comparable with the length of the tubular piece 21, so that these ribs 42 extend practically along the entire tubular piece 21. That one length of the ribs 42, which matches the radial direction, is chosen so that the ribs 42 bridge the distance, the gap resp. between the interior surface 43 of the tubular piece 21 and the outer surface 14 of the spring arrangement 10. The interior rib 42 (FIG. 4) has a main body 41 which has an essentially rectangular cross-section. The main body 41 having such a cross-section is essentially not yielding. One of the sides, surfaces resp. of the main body 41, having said cross section, namely the base of the same, adjoins the inside 43 of the tubular piece 21, so that the inside rub 42 is in one piece with the tubular piece 21 because of said surface. The front area 40 of the rib main body 41, which opposes said base is adapted in such a way, that the adjusting equipment 10 is inserted in the guiding sleeve 20 free of clearance, free of wabbling, resp.

In order to achieve said purpose, the front area 40 of the rib 42 has a front face 39 which is hollow, concave resp. The curvature of this front face 39 lies in a plane, which is perpendicular to the main axis A. The radius of this curvature corresponds to or is as great as the radius of the outer surface 14 of the adjusting equipment 10. Such front faces 39 of the inside ribs 42 cause the exential part of the holding of the adjusting equipment 10 in the guiding tube 1.

In order to equalize or to prevent respective deviations of the preset measurements of the components of the support, whereby said deviations are caused by the manufacturing of said components, the front area 40 of the inside ribs 42 can be carried out as described in the following.

The main body 41 of the rib has corner sections, each one of them is placed where the front area 40 of the inside rib 42 meets the respective lateral surface 48, 49 resp. of the main body 41 of the inside rib 42. A lip 50 projects from at least one of the corner sections of the rib's main body 41. In the axial direction, said lip 50 extends along the main body 41 of the inside rib 42. In the peripheral direction, said lip 50 extends with respect to the tubular piece 21 nearly tangentially. The lip 50 projects from all the inside ribs 42 of one of the embodiments of this invention from the same corner section of the inside rib 42. That one cross-section of the lip 50, which extends perpendicularly to the main axis A is essentially arched. The interior of this arch is turned away from the main axis A, so that at least that one surface 51 of the lip 50. which faces the main axis A is convex. This surface 51 of the lip 50 lies nearer to the main axis A than the concave front face 39 of the rib's main body 41.

In the embodiment, which is depicted in FIG. 4, the lip 50 projects from that one corner section of the inside rib 42, which opposes the middle of the bib 42 in the counter-clock direction. Furthermore, said lip 50 extends practically parallel to the main axis A of the support.

The guiding sleeve 20, which is depicted in FIG. 5 and 6, has inside ribs 44, which extend inclined with respect to the main axis A of the support to the surface lines of the tubular piece 21 resp. FIG. 8 shows the interior side 43 of the guiding sleeve 20 according to FIG. 5 and 6, when this interior side 43 is developed into a flat plane. The inside ribs 44 of this guiding sleeve 20 extend inclined along the whole height of the tubular piece 21. The main body 41 of the respective inside rib 42 and the lip 50, which adjoins said main body 41, have an upper front face 52 and a lower front face 53, whereby the respective front face 52, 53 resp. is placed in one of the end sections of the tubular piece 21. Because of the inclination of the lips 50, which adjoin the inside ribs 42, the contours of the said front faces 52 and 53 are staggered in the peripheral direction of the tubular piece 21 to each other (FIG. 6).

As it is apparent from FIG. 9, two sets of parallel to each other running inside ribs 44 and 45 can be placed at the inside 43 of the guiding sleeve 20. The ribs 44 of the first set correspond to those ribs, which were already described in connection with FIG. 8. These ribs 44 extend with respect to the axis A, with respect to one of the surface lines M of the tubular piece 21 resp. under an angle beta, which extends to the right from the main axis A. The ribs 45 of the second set extend with respect to the axis A under an angle gamma, which extends from the main axis A to the left. The magnitudes of the angles beta and gamma can be equally large. Said angles can be sharp angles and the magnitude of such angles can lie in the area of 10 degrees. In this manner, the neighboring ribs 44 and 45 form the legs of the letter V.

Figure 10:
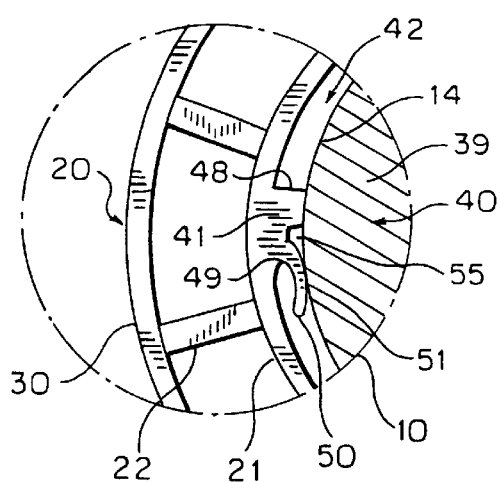

FIGS. 10 to 13 show enlarged four further embodiments of the front area 40 of the inside ribs 42 of the guiding sleeve 20. The front area 40 of the inside rib 42, which is shown in FIG. 10 in a horizontal cut, is very similar to that one front area, which has been described in connection with FIG. 4. Additionally to the front area shown in FIG. 4, the front area 40 according to FIG. 10 is provided with a groove 55 in the front face 39 of the inside rib 42. This groove 55 is placed in the middle area of the width of the main body 41 of the inside rib 42. Said groove 55 opens against the main axis A, against the adjusting equipment 10 rests. To the other side of the groove 55, the lip 50 is placed, which has also already been described.

The front area 40 of the inside rib 42 has two grooves 55 and 56, which are carried out in the front face 39 of the inside rib 42. These two grooves 55 and 56 have practically the same shape. This has also been described in connection with the groove 55 according to FIG. 10. The front face 39, on which the spring 10 rests, is placed between the grooves 55 and 56.

Figure 11:
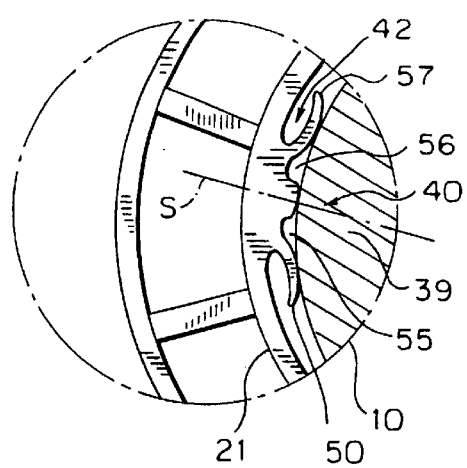

The front area 40 according to FIG. 11 has furthermore a second lip 57. This lip 57 is placed opposite to the front face 39 of the first lip 50 and said second lip 57 is attached to the outside of the second groove 56 in the manner, which has already been explained in connection with the lip 50 of the front area 40 according to FIG. 10. The front area 40 according to FIG. 11 can be symmetrical with respect to an axis S, whereby this axis S of symmetry goes through the middle of the width of the front face 39 and in radial direction with respect to the tubular piece 21.

Figure 12:
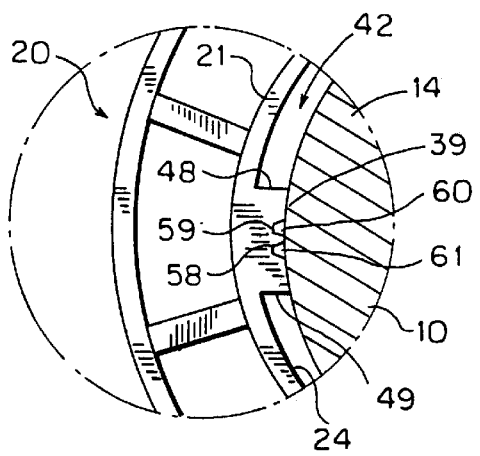

That embodiment of the inside rib 42, which is depicted in FIG. 12 has an essentially rectangular cross-section, whereby this inside rib 42 adjoins the tubular piece 21 in the manner already described. This inside rib 42 has practically flat running lateral surfaces 48 and 49, which bridge the distance between the interior surface 24 of the tubular piece 21 and the outer surface 14 of the spring 10.

Beginning from the front face 39 of the inside rib 42, a recess 58 is carried out in the inside rib 42. This recess 58 is placed approximately in the middle of the width of the front face 39 or the inside rib 42 and it extends along the inside rib 42. The recess 58 has a relatively wide bottom 59, from which a lip 60 extends upwards. This lip 60 has a practically triangle shaped cross-section, whereby this lip 60 is attached to the bottom 59 of the recess 58 through one of its sides and it is in one piece with said bottom 59. The height of the lip 60 is somewhat greater than the depth of the recess 58, so that the edge 61 of the lip 60, which is averted from the bottom 59 of the recess 58, protrudes from the recess 58, when the adjusting equipment 10 is not placed in the guiding tube 20. In the depicted case, the adjusting equipment 10 is put in the sleeve 20 and therefore the lip edge 61 is shown bent to one side.

Figure 13:
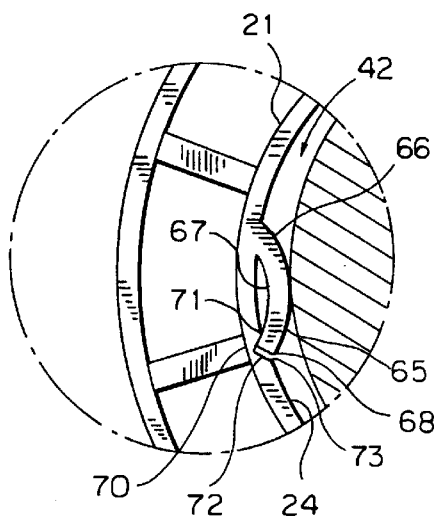

The inside rib 42 according to FIG. 13 is carried out as a rib, which can be bent to one side. Like the inner ribs described in the foregoing, this rib 42 extends along the tubular piece 21. The present inside rib 42 has a main body 65, which has an essential rectangular shaped cross-section. One of the shorter sides of said cross-section adjoins the interior surface 24 of the tubular piece 21 and said shorter side is in one piece with the tubular piece 21. The length of the lateral surfaces 66 and 67 and the length of the front surface 68 of the inside rib 42, which is averted from the tubular piece 21, are so rated, that this inside rib 42 can be deflected to one side, until the free and the front face 68, encompassing the end portion of the inside rib 42, at least touches the interior surface 24 of the tubular piece 21.

In that one area of the interior surface 24 of the tubular piece 21, in which the free end portion 68 of the rib 42 can come to rest, a recess 70 is carried out, which extends along the tubular piece 21. The end portion, the comb 68 resp. of the inside rib 42 can take place in said recess 70. The recess 70 has an essentially V-shaped cross-section, which consists of flanks 71 and 72. The angle, which extends between these flanks 71 and 72, amounts to practically 90 degrees. The inclination of the flanks 71 and 72 regarding the inside surface 24 of the tubular piece 21 is chosen in such a way, that the comb 68 of the inside rib 42 can take place in the recess 70 in such a manner, that the interior lateral surface 67 of the rib 42 rests on the first V-flank 71, and that the front face 68 of the rib 42 rests on the second V-flank 72 of the recess 70.

The length of the front face 68, i.e. the width of the rib 42, and the length of the lateral surface 66 and 67 of the rib 42 are chosen under the consideration of the properties of the material, which is used for the manufacturing of the guiding sleeve 20, so that a gap 73 exists between the front face 68 of the rib 42 and the V-flank 72 of the recess 70, which opposes the rib 42, when no lateral force acts on the spring 10 or when the magnitude of said force lies within predetermined limits. If the adjusting equipment 10 is laterally overloaded, the inside rib 42 gives way in a manner; that the comb 68 moves in the recess 79. Thereby, the interior lateral surface 67 of the rib 42 glides on the first V-flank 71 and the front face 68 of the rib 42 moves against the second V-flank 72 of the recess 70 until this front face 68 rests on the second flank 72 of the recess 70. In this moment, this embodiment of the rib 42 achieves the maximum of its stiffness.

Said gap 73 between the front face 68 of the rib 42 and the second flank 72 of the recess 70 can be also of advantage for example in that case, when the adjusting equipment 10, for example for repair purposes, must be combined in one support.

It should be understood, that the forms of the front areas 40 of the inside ribs 42 and the forms of the course of these inside ribs 42 along the tubular piece 21, which were described in the foregoing, can be combined in one support.

The present support has among others the advantage, that it does not need any finishing and that it is nevertheless free of clearance. Among other things, this lowers significantly the manufacturing costs.

What is claimed is:

1. A support, suitable for chairs and tables comprising a guiding tube (1) for coupling with a base of a chair or table;

an adjusting arrangement (10) for adjusting the length of the support for coupling with the table or a seat of the chair;

a sleeve (20) having a tubular piece (21) that is inserted in the guiding tube (1) and has a main axis A whereby the adjusting arrangement (10) goes through said sleeve, and whereby said sleeve has outside ribs (23) and inside ribs (42) that are arranged around the circumference of the tubular piece (21) of the sleeve (20), and wherein a front area (39) of the inside ribs (42) is provided with at least one lip (50,57), a main body (41) of said lip (50,57) is shaped in such a manner that at least that one surface (51) of the lip (50,57), which faces the main axis A and on which the adjusting (equipment) arrangement (10) rests, is convex, said lip runs in the peripheral direction about said tubular piece (21) of the sleeve approximately tangential thereto, and the lip (50,57) extends vertically along the tubular piece (21) of the sleeve (20), each inside rib (42) has a stiff main body (41) having a substantially rectangular cross-section, said main body (41) has corner sections arranged where the front area (39) of each inside rib (42) meets the respective lateral surface (48,49) of the main body (41) of this said inside rib (42), and the lip (50,57) protrudes from at least one of the corner sections of the rib main body (41) and extends along the main body (41) of the inside rib (42).

2. A support for chairs and tables comprising a guiding tube (1) adapted to be coupled with a base of a chair or table, an adjusting arrangement (10) for adjusting the length of the support, whereby this adjusting arrangement is adapted to be coupled with the table or a seat of the chair, a sleeve (20) being a tubular piece (21), said sleeve being inserted in the guiding tube (1) and having a main axis A, whereby the adjusting arrangement (10) goes through said sleeve, and wherein the sleeve has outside ribs (23) and inside ribs (42) which are arranged around the periphery of the tubular piece (21) of the sleeve (20), wherein each of said inside ribs has a front face (39), a recess (58) is provided in the front face (39) of each inside rib (42) approximately in the middle of the width of said front face (39), said recess having a depth, and each said inside rib has a lip (60) that has an edge (61), said recess (58) of each said inside rib (42) has a relatively wide bottom (59) and said lip (60) extends away from said bottom, said lip (60) of each said inside rib (42) has a height greater than the depth of the recess (58), and the edge (61) of the lip (60) is averted from the bottom (59) of the recess (58), and protrudes from the recess (58), when the adjusting arrangement (10) is removed from the sleeve (20).

3. The support according to claim 2, wherein, said lip (60) of each said inside rib (42) has an approximately triangle shaped cross-section, said lip (60) has a side that is attached to the bottom (59) of the recess (58), and said lip is in one piece with said bottom (59).

4. The support according to claim 2, wherein each said inside rib (42) has an essentially rectangular cross-section, and approximately flat running lateral surfaces (48,49) that bridge the distance between the inside surface (24) of the tubular piece (21) and the front face (39).

5. A support adapted for use with chairs or tables, comprising a guiding tube (1) adapted to be coupled with a base of a chair or table, an adjusting arrangement (10) for adjusting the length of the support, said adjusting arrangement (10) being adapted to be coupled with the table or a seat of the chair, a sleeve (20) which is inserted in the guiding tube (1) and has a main axis A, said sleeve having a tubular piece (21), wherein the adjusting arrangement (10) goes through said sleeve, and the sleeve has outside ribs (23) and inside ribs (42) which are arranged around the peripheral circular length of the tubular piece (21) of the sleeve (20), wherein each said inside rib (42) has a flexible main body (65) which can be bent to one side to have the shape essentially of a convex arch, the inside of said arch is turned away from the main axis A, the main body (65) of each said inside rib (42) has a substantially rectangularly shaped cross-section with two shorter sides, one of the shorter sides of said cross-section adjoins the inside surface (24) of the tubular piece (21), and said one of the shorter sides is in one piece with the tubular piece (21) and said rib (42) extends along the tubular piece (21).

6. The support according to claim 5, wherein each of said inside ribs (42) has an end portion, two lateral surfaces (66, 67) and a front surface (68) that encompasses the end portion and is averted from the tubular piece (21) and extends between said two lateral surfaces (66, 67), each surface (66, 67, 68) having a length, wherein the length of the lateral surfaces (66, 67) and the length of the front surface (68) of the inside rib (42) which is averted from the tubular piece (21), are selected so that each inside rib (42) can be deflected to one side until said front surface (68) touches the inside surface (24) of the tubular piece (21).

7. The support according to claim 5, wherein:

each of said inside ribs has a free end portion corresponding to the other one of the two shorter sides of the cross section of the main body (65) and the tubular piece (21) of the sleeve has an inside surface provided with a recess (70) in which the free end portion (68) of the rib (42) is adapted to rest, said recess (70) extends along the tubular piece (21) and is shaped and serves for receiving said free end portion (68) of the inside rib (42).

8. The support according to claim 7 wherein:

each of said inside ribs (42) has at least one lateral surface (67) and a front surface (68) that encompasses the free end portion and is averted from the tubular piece (21), the recess (70) has flanks (71, 72) that form an essentially V-shaped cross-section, said flanks(71, 72) form an angle of approximately 90 degrees, said flanks (71,72) have an inclination with respect to the inside surface (24) of the tubular piece (21) adapted to receive the free end portion (68) of the inside rib (42) in such a manner that the lateral surface (67) of the inside rib (42) rests on one of said flanks (71) and the front surface (68) of the inside rib (42) rests on the other one of said flanks (72) of the recess (70).

9. The support according to claim 8, wherein:

the free end portion (68) of each of said inside ribs (42) has a length, corresponding to the width of the inside ribs (42), the lateral surface (67) of each inside rib (42) has a length between the two shorter sides, and the length of the free end portion (68) and of the lateral surface (67) are chosen under the consideration of the properties of the material of the guiding sleeve (20), so that a gap (73) exists between the front face (68) of each said inside rib (42) and the V-flank (72) of the associated recess (70) which opposes the rib (42).

10. A vertically adjustable support for a chair or table, comprising an adjusting arrangement (10) for adjusting the length of the support and a sleeve (20) for vertically guiding said adjusting arrangement (10), whereby said sleeve (20) is inserted in a guiding tube (1), said sleeve (20) having a cylindrical tubular portion (21) having outwardly projecting exterior ribs (22) extending to an interior surface ace (24) of the guiding tube (1) said sleeve (20) further comprising interior ribs (42) projecting inwardly, each said inside rib (42) having a main body (41) with an inside portion (40) facing said adjusting arrangement (10), said inside portion (40) having a curved front face (39) and at least one lip (50,57,60), and at least one groove (55, 56) in said front portion (40) of said inside rib (42).

11. A support, suitable for chairs or tables, comprising:

a guiding tube (1) for coupling with a base of a chair or table;

an adjusting arrangement (10) for adjusting the length of the support, whereby this adjusting arrangement (10) is adapted for coupling with the table or a seat of the chair; and a sleeve (20) having a tubular piece (21) that is inserted in the guiding tube (1) and has a main axis A, whereby the adjusting arrangement (10) goes through said sleeve, and whereby said sleeve has outside ribs (23) and inside ribs (42, 44) which are arranged along the periphery of the tubular piece (21) of the sleeve (20), wherein each inside rib (42, 44) comprises a first part having a stiff main body (41) that extends generally in the direction of the main axis A of the sleeve (20) and that has substantially a rectangular cross-section with lateral surfaces (48,49), said main body (41) has a front area (40) facing the adjusting arrangement (10), said main body (41) has corner sections where the lateral surfaces (48, 49) of the main body (41) meet the inside surface (43) of the tubular piece (21), each inside rib (42, 44) further comprises at least one lip (50,57) that protrudes from at least one of said corner sections and that has a surface (51) that faces the main axis A and on which the adjusting arrangement (10) can rest, said lip (50,57) has a yielding main body which extends along the stiff main body (41) of the inside rib (42, 44) generally in the direction of the main axis A of the sleeve (20), the yielding main body of the lip (50,57) is shaped such that at least the surface (51) of the lip (50, 57) that faces the main axis A is convex, each inside rib (42, 44) comprises also at least one groove (55,56) located between the front area (40) of the stiff main body (41) and the yielding main body of said lip (50,57), and said at least one groove (55,56) extends along the inside rib (42, 44) generally in the direction of the main axis A of the sleeve (20) and opens toward said main axis A.

12. The support according to claim 11, wherein, with respect to each said inside rib (42, 44), said at least one lip (50, 57) comprises two lips each protruding from a respective corner section of said inside rib, each said lip is disposed at a respective corner section of said stiff main body (41) and extends generally in the direction of the main axis A of the sleeve (20), said at least one groove (55,56) comprises two grooves each located between said front area (40) of said stiff main body (41) and the yielding main body a respective lip (57), said two grooves (56) extend along the inside rib (42, 44) generally in the direction of the main axis A of the sleeve (20), and each of said two grooves opens toward said main axis A.

13. The support according to claim 11, wherein, with respect to each said inside rib (42, 44), said lip (50) protrudes from a given corner section and extends in a given peripheral direction so that all of said inside ribs (42, 44) have respective lips that all project in the same peripheral direction.

14. The support according to claim 11, wherein, with respect to each said inside rib (42, 44), said at least one lip (50, 57) comprises two lips each protruding from a respective corner section of said inside rib, each said lip is disposed at a respective corner section of said main body (41) and extends generally in the direction of the main axis A of the sleeve (20), said at least one groove (55,56) comprises two grooves each located between said front area (40) of said stiff main body (41) and the yielding main body of a respective lip (57), said two grooves (56) extend along the inside rib (42, 44) generally in the direction of the main axis A of the sleeve (20), and each of said two grooves opens toward said main axis A, each lip projects in a respectively different peripheral direction so that the two lips (50, 57) of each said inside rib (42, 44) project in respectively opposite peripheral directions.

15. The support according to claim 11, wherein the lip (50, 57) of each said inside rib (42, 44) has a cross section in a plane perpendicular to the main axis A, in which cross section the lip (50, 57) is arched and projects in a peripheral direction about said tubular piece (21) and is approximately tangential thereto.

16. The support according to claim 11, wherein the adjusting arrangement (10) has an outer wall (14) with a radius of curvature, the front area (40) of the main body (41) of each said inside rib (42, 44) has a concave front face (39) with a radius of curvature that corresponds to the radius of curvature of the outer wall (14) of the adjusting arrangement (10), and the surface (51) of each said lip (50,57) that faces the main axis A lies nearer to the main axis A than the concave front face (39), at least when said adjusting arrangement (10) is withdrawn from said sleeve (20).

17. The support according to claim 16, wherein said front area (40) of said stiff main body (41) of each said inside rib (42, 44) is symmetrical with respect to an axis of symmetry (S) that goes through the middle of the width of the front face (39) and extends radially with respect to the tubular piece (21) of the sleeve (20).

18. The support according to claim 11, wherein the guiding sleeve (20) is inserted in a free upper orifice (19) of the guiding tube (1), a ring shaped collar (30) having an upper side is provided in the upper area of the guiding sleeve (20), at least one bore (37) is provided in said ring collar (30), said bore (37) has a longitudinal axis that runs parallel to the main axis A of the sleeve (20), and at least one stop buffer (75) is located within the bore (37) in such a manner that a head (76) of the buffer protrudes from the upper side of the ring shaped collar (30).

19. The support according to claim 11, wherein the inside ribs (44) are inclined with respect to the main axis A of the sleeve (20) and parallel to each other, along the whole height of the tubular piece (21) of the sleeve (20).

20. The support according to claim 19, wherein the inside ribs (44, 45) are arranged in first and second sets, all of said inside ribs are inclined with respect to the main axis A of the sleeve (20), an inside rib (44) of the first set alternates with an inside rib (45) of the second set, and each rib of the first set and an adjacent rib of the second set form the legs of the letter V.

* * * * *